(12) United States Patent
Jamil et al.

(10) Patent No.: US 10,178,436 B2
(45) Date of Patent: Jan. 8, 2019

(54) METHOD TO AUTO-SELECT MEDIA CHANNEL PROGRAMS

(71) Applicant: International Business Machines Corporation, Armonk, NY (US)

(72) Inventors: Mamnoon Jamil, Voorhees, NJ (US); Grant D. Miller, Arvade, CO (US); Cheranellore Vasudevan, Bastrop, TX (US); Jian Wu, Mansfield, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/951,745

(22) Filed: Nov. 25, 2015

(65) Prior Publication Data

US 2017/0150221 A1    May 25, 2017

(51) Int. Cl.
*H04N 21/466* (2011.01)
*H04N 21/44* (2011.01)
(Continued)

(52) U.S. Cl.
CPC ......... *H04N 21/4662* (2013.01); *G06Q 30/00* (2013.01); *H04N 21/4383* (2013.01);
(Continued)

(58) Field of Classification Search
CPC ........... H04N 21/4662; H04N 21/4667; H04N 21/4668; H04N 21/4383; H04N 21/44204;
(Continued)

(56) References Cited

U.S. PATENT DOCUMENTS 5,734,720 A * 3/1998 Salganicoff .......... G06Q 20/383
  348/E7.056
6,163,316 A * 12/2000 Killian ............... H04N 5/44543
  348/553

(Continued)

FOREIGN PATENT DOCUMENTS

EP  1461943 A2  9/2004
WO  2008150340 A1  12/2008
WO  WO 2008150340 A1 * 12/2008  ............. H04N 7/163

OTHER PUBLICATIONS

Lohmar, et al. "Multiparty Multimedia Session Control Working Group", 2009, 15 pages.

*Primary Examiner* — Hai V Tran
(74) *Attorney, Agent, or Firm* — Cantor Colburn LLP; Kurt Goudy

(57) ABSTRACT

A computer-implemented method of selecting a media program includes continuously monitoring a plurality of media programs on available channels and analyzing, by a processor, a content of the programs. The content is compared to a set of user preferences and the programs are ranked based on the user preferences. An optimal program is selected based on the rankings and is switched to. A media system includes a media output device and a user interface. A controller is operably connected to the media output device and to the user interface. The controller includes a control system configured to monitor media programs on available channels and analyze a content of the media programs. The content is compared to a set of user preferences and the programs are ranked based on the user preferences. An optimal media program is selected based on the rankings and is switched to by the control system.

8 Claims, 2 Drawing Sheets

(51) Int. Cl.
  *H04N 21/442*  (2011.01)
  *H04N 21/438*  (2011.01)
  *H04N 21/45*  (2011.01)
  *G06Q 30/00*  (2012.01)

(52) U.S. Cl.
  CPC . *H04N 21/44008* (2013.01); *H04N 21/44204* (2013.01); *H04N 21/44222* (2013.01); *H04N 21/4532* (2013.01); *H04N 21/4667* (2013.01); *H04N 21/4668* (2013.01)

(58) Field of Classification Search
  CPC ....... H04N 21/44008; H04N 21/44222; H04N 21/4532
  See application file for complete search history.

(56) References Cited

U.S. PATENT DOCUMENTS

| | | | |
|---|---|---|---|
| 7,937,725 B1 * | 5/2011 | Schaffer | H04N 21/44222 725/26 |
| 9,032,428 B2 | 5/2015 | Wan et al. | |
| 2002/0199186 A1 * | 12/2002 | Ali | G11B 27/105 725/28 |
| 2012/0174159 A1 * | 7/2012 | Arte | H04N 21/2668 725/46 |
| 2012/0271688 A1 | 10/2012 | Jaouen et al. | |
| 2014/0184917 A1 | 7/2014 | Naikraikar | |
| 2014/0229964 A1 | 8/2014 | Waisanen et al. | |
| 2014/0245187 A1 | 8/2014 | Tseng et al. | |

\* cited by examiner

METHOD TO AUTO-SELECT MEDIA CHANNEL PROGRAMS

BACKGROUND

The present invention relates to selecting media programming for play on a device, and more specifically, to a method for auto-selecting programming for play.

When there are several programs running at same time in different media channels and available for, for example, viewing or listening at a device, choosing a preferred program for listening or viewing is a laborious process. Also, while playing one program on the device, there are time periods and/or situations where the content is not of interest either because of specific elements of the program, or the program has been interrupted by advertisements which are of no interest. It is desirable to switch to another program during these periods, and return to the preferred program when such periods have ended, or alternatively switch to a third program depending on what programs are being provided at any point in time. Unless one monitors all of the channel schedules closely and dynamically assesses the current content of the programs, skipping to the most appropriate channel/portions of the program is difficult.

SUMMARY

In one embodiment, a computer-implemented method of selecting a media program includes monitoring a plurality of media programs on a plurality of available channels and analyzing, by a processor, a content of the plurality of media programs. The content is compared to a set of user preferences and the plurality of programs are ranked based on the set of user preferences. An optimal program is selected based on the rankings and the processor initiates switching to the optimal program.

In another embodiment, a media system includes a media output device and a user interface. A controller is operably connected to the media output device and to the user interface. The controller includes a control system configured to monitor a plurality of media programs on a plurality of available channels and analyze a content of the plurality of media programs. The content is compared to a set of user preferences and the plurality of programs are ranked based on the set of user preferences. An optimal media program is selected based on the rankings and is switched to by the control system.

In yet another embodiment, a computer program product for selecting a media program includes a non-transitory storage medium readable by a processing circuit and storing instructions for execution by the processing circuit for performing a method including monitoring a plurality of media programs on a plurality of available channels, analyzing, by a processor, a content of the plurality of media programs, comparing the content to a set of user preferences, ranking the plurality of programs based on the set of user preferences, selecting an optimal program based on the rankings and switching to the optimal program.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
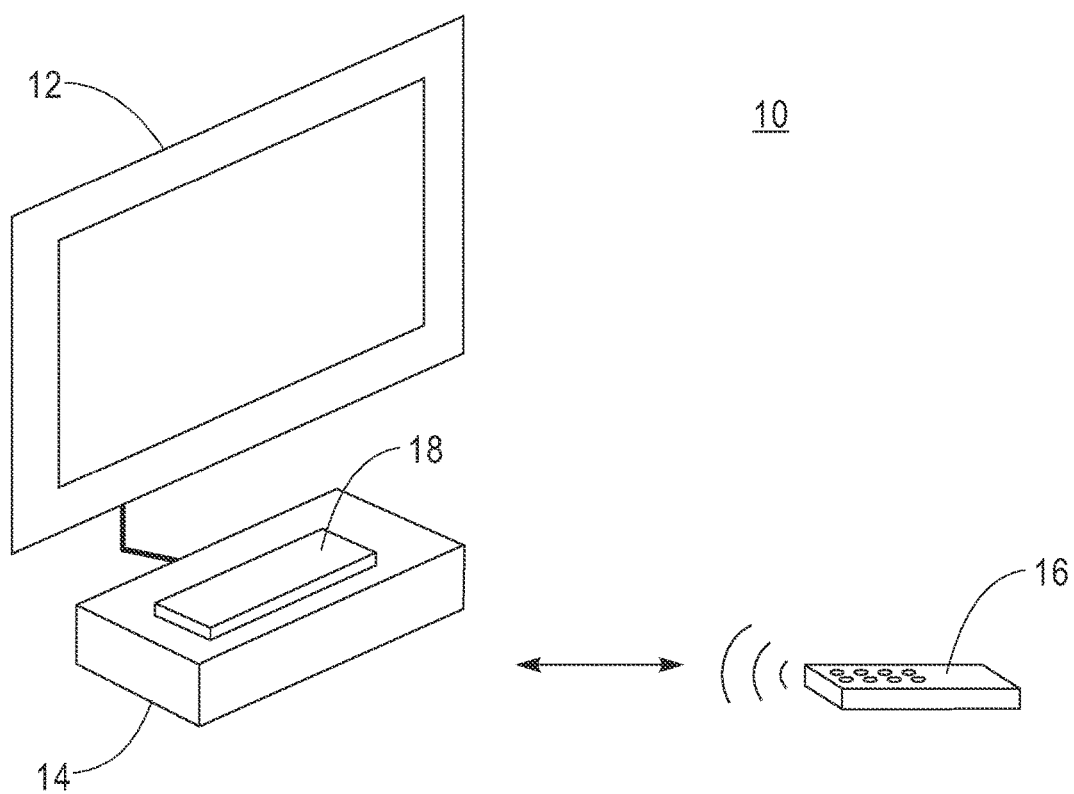
FIG. 1 is a schematic view of an embodiment of a media system.

Referring now to FIG. 1, an example of a media system 10 is illustrated. The media system 10 includes a media output device, such as a display 12, such as a television, computer screen, radio broadcast, or the like. A controller 14 is connected to the display 12 to control the programming presented on the display 12 and may be, for example, a television receiver, cable television box, computer, or the like. In some embodiments, the media system 10 includes a user interface 16, such as a remote control that may be wirelessly connected to the controller 14, or alternatively connected to the controller 14 via a wired connection. The controller 14 includes a control system 18 that automatically selects programming to present at the display 12 based on user preferences.

For example, the control system 18 may change a television broadcast to a more desired program of channel based on user preferences or the controller 14 may change a television broadcast to another channel based on the types, categories or specific contents of programming available. The user may specify preferred programs, preferred program categories and/or preferred channels, among other factors. The control system 18 collects details of currently running programs on the different subscribed channels and compares the available programming to the user preferences, then activates the channel that is the closest available match to the user preferences.

Moving to a different channel may also be determined by how long the current programming runs, what type of program segment is running, and whether the user desires to stay with it. Moving to another channel may also be determined by whether the current program segment is of interest or not or needs to be avoided. The control system 18 will return to the previous program once the undesired portion, such as an advertisement, is over. Switching may also be based on the stage of the program, for example, even though, action movie is a preferred program and there is one being broadcast currently, the control system 18 checks whether the movie is half-way or beyond and determines that it is not best to switch. Similarly, if someone is interested in "car chases" or other such content in a movie, the control system 18 switches only when that particular part of the program is running.

In addition to television viewing, one skilled in the art will readily recognize that a control system 18 may be utilized to selectively listen to subscribed podcast channels, radio broadcasts, conference calls or the like.

Figure 2:
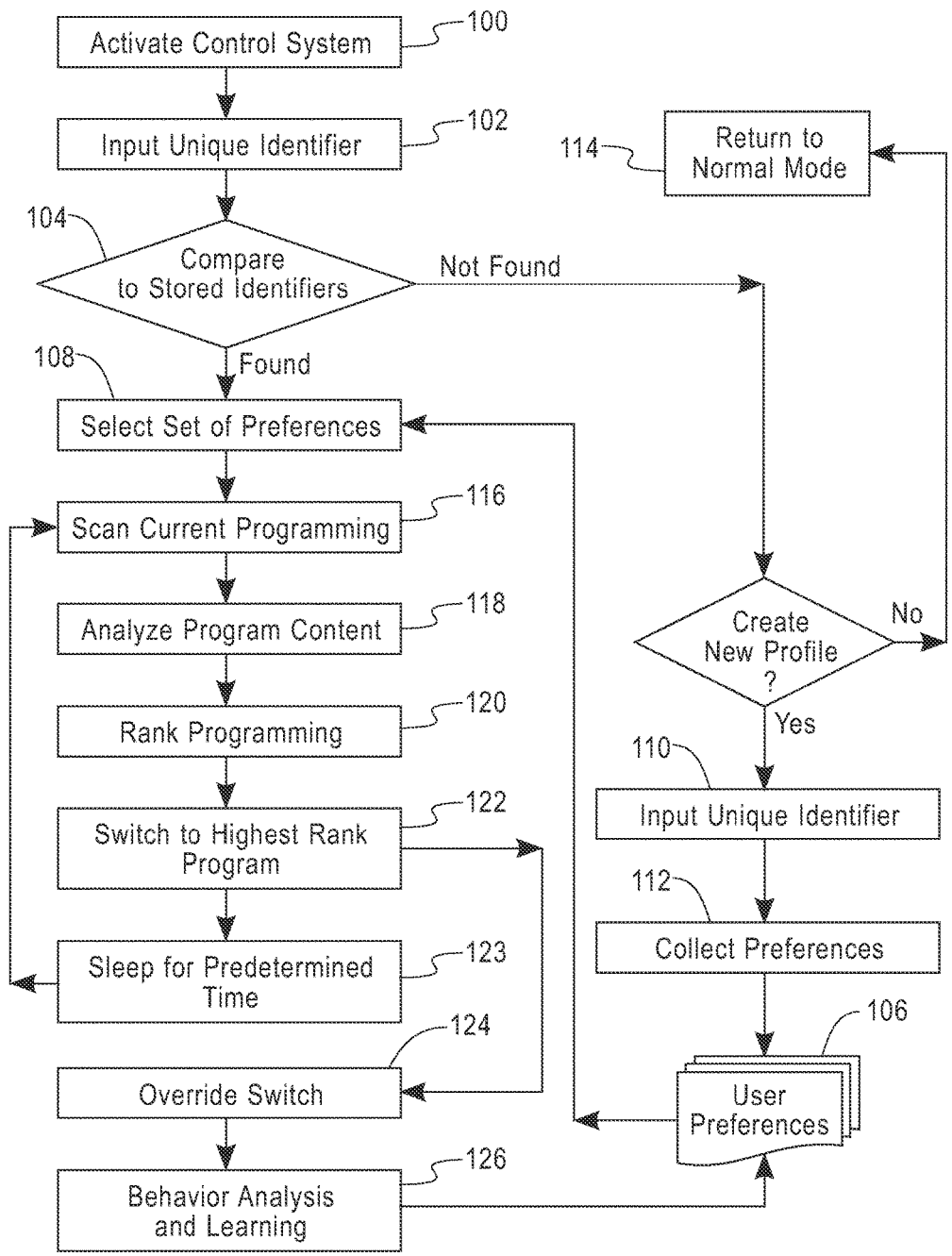
FIG. 2 is a flow diagram illustrating operation of an embodiment of a controller for a media system.

A flow chart illustrating operation of the control system 18 and a method for selecting and switching to desired programming based on user preferences is shown in FIG. 2. In block 100, the control system 18 is switched on via the user interface 16, such as a remote control. In block 102, the user inputs a unique identifier into the user interface 16, which is communicated to the control system 18. The unique identifier is utilized to identify the user of the media system 10. In some embodiments, the unique identifier may be a finger print while in other embodiments the unique identifier may be a numerical code or an alphanumeric code. In some embodiments, facial recognition may be utilized. In block 104, the input unique identifier is compared to stored unique identifiers at the control system 18. While in the this embodiment, the stored unique identifiers are stored at the control system 18, in other embodiments the stored unique identifiers may be stored at, for example, the user interface 16.

If the entered unique identifier is found among the stored unique identifiers a set of user preferences 106 corresponding to the unique identifier, also referred to as user's profile, is selected at block 108. The user preferences 106 may be general, based on types or categories of programs such as "sports", "movies", "music" or "news", or may be more specific, relating to particular programs on specific channels at selected times, such as "soccer game on XYZ network at 7 pm on Friday". Alternatively, if the entered unique identifier is not found among the stored unique identifiers, the control system 18 may prompt for a new user profile to be entered. If the user desires to enter a user profile, a unique identifier is collected at block 110 and new user preferences are collected and stored at block 112. If, one the other hand, the user does not desire to enter a new user profile, the media system 10 enters a normal operating mode at block 114.

Once the user preferences are selected at block 108, the content of currently running programming on all subscribed channels is scanned at block 116. At block 118, the content of the currently running programming is analyzed with regard to the factors present in the selected user preferences. The programming is sorted and ranked in order of priority relative to the preferences at block 120. At block 122, the control system 18 then causes the programming that is the best match to the user preferences, based on the priority ranking, to be presented at the display 12. The method sleeps for a predetermined time (zero or more) at block 123 for example, one minute or five minutes, then the method returns to block 116 to again scan the content of currently running programming on all subscribed channels.

Block 120 determines a priority "p" of programming presented to the user utilizing a priority function incorporating a number of factors, in one embodiment represented as in expression 1 below:

$$p(G,D,L,T,C) \qquad (1)$$

The priority value is determined for each program currently running. G represents program type or category, such as news, sports, movie, comedy, drama, music or the like, with the user ranking such categories in order of preference. Preferred program categories will have a positive priority value, while disliked categories will have a negative priority value. D represents dynamic contents of the program such as commercial advertisement, political news, analyst discussion, violence, etc., which the user may like, having a positive priority value, or dislike, having a negative priority value. L represents elapsed time of the program. If the user has been already viewing the program, L will be a positive value implying that the user will likely wish to continue viewing the program. Similarly, if the user has so far not been viewing the program, L will have a negative value implying that it is not likely that the user would like to view the program. L has a different effect on overall priority differently for different program categories. For example, L may affect movie programming strongly, but may affect sports programming to a lesser degree.

T is the current physical time, such as year, month, date, time. A user may, for example, prefer movie programming during weekend evenings or have a higher preference for news programming during election seasons. C represents a preference for continuation of previously viewed programs. If a program is a continuation of a previously played program, such as a sequel or part of a series, and the user has viewed all or most of the previous programs, a higher priority is set for the sequel. To illustrate the priority function, a number of examples are included herein.

Example 1

David has important internet meetings, so he set internet meeting with highest priority p(G=meeting, D, L, T, C)>p(G=others, D, L, T, C). So at any time, if a meeting is called, he will be switched to the meeting regardless any other program is playing or not. When the meeting is on, it will not be interrupted by any other program.

Example 2

Mary likes to watch movies, but she dislikes violence and commercial advertisements. So she sets p(G=movie, D={prohibit violence, commercial}, L, T, C)<0, so when a commercial is displayed in the middle of a movie she is watching, the program will automatically switched to other programs. When the commercial is over, the dynamic parameter D is reset and the she will be switched back to the movie she was watching. (Note that the lost contents were commercial, so it will not have penalty of negative L, so it will not be have the negative effect on original movie program.)

Example 3

John prefers new released movies over re-run movies, but he also prefers not to be interrupted when watching a movie. So he sets p(G=new-movie, D, L=0, T, C)>p(G=rerun, D, L=0, T, C), and p(G=any-movie, D, L<=0, T, C)<p(G=any-movie, D, L>0, T, C). So if two movies arrive at the same time, he will enjoy watching the new movie over re-run. But when he is in middle of watching a re-run movie, he will not be switched out even a new movie comes.

Example 4

Frank prefers movie to sports programs, however, he does not like to watch half of a movie but is ok to watch second half of a sports program because he can catch scores and end of the game highlights. So he set p(G=movie, D, L=0, T, C)>p(G=sports, D, L=0, T, C) and p(G=movie, D, L<0, T, C)<p(G=sports, D, L<0, T, C). When he finishes an important on-line lecture and wants to have some entertainment, with both second halves of a movie and a game going on, the game will be presented to him.

Example 5

Ann is following a few TV shows this current season. She sets p(G=TV Show, D, L, T, C=Continue) to high priority. So when next season these shows are back they will have higher priority to be selected.

At block 124, the user may override the selected program and manually switch to or from programs of the user's choice. This behavior is recorded and may be used to modify the priority function through a behavior analysis and learning function at block 126. The behavior and learning function monitors and analyzes the user's behavior and utilizes the analysis to modify or update the priority function and user preferences 106 over time. For example, the behavior and learning function may analyze which type of programs the user views during select times of day. Further, the analysis may include analysis of the manual overrides performed by the user, and analysis of viewed programs to adjust priorities of program types or create new program types if needed. Examples of the behavior analysis and learning function are included below to illustrate its operation.

Example 6

Jennifer has a balanced program type in her original setting including news, weather, movie, and sports, with priorities in this order. However, she usually goes to bed earlier, and during her regular watching hours, according to her original priorities, there are three news programs but no weather programs. The behavior analysis and learning function adjusts her priority to reduce one news program and add one weather program in her regular viewing hours.

Example 7

David is a fan of a certain movie series, and he has watched all available movies the series and many news programs related to the movie series. The behavior analysis and learning function logic learned this fact and auto-adjusted the p(G=movie series, D, L, T, C) to be higher. So when next movie in the series is available, it will have higher priority to be selected.

Example 8

Jennifer has used manual override a few times to not to switch from some commercial advertisements. The behavior analysis and learning function analyzed the contents of the commercial advertisements Jennifer viewed, and determined they were for a certain product category. The behavior analysis and learning function determined that Jennifer is currently interested this this type of commercial advertisements, therefore adjusted priority settings to keep this particular category of commercial advertisements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of selecting a media program to be watched on a media system, the media system comprising:
    a media output device;
    a controller, including a control system which is coupled to the media output device; and
    a remote control, including a user interface, which is disposed remotely from the controller,
    the control system being switchable into an on-state via the user interface and receptive of a fingerprint, alphanumeric code or facial recognition identifier of a user via the user interface, the control system being configured to select a set of user preferences in an event the identifier is found and to collect a new identifier or to enter a normal operating mode in an event the identifier is not found,
    the computer-implemented method being executable by the control system and comprising:
    operating the media output device to display a media program which is broadcast to and received by the media output device on a first channel;
    monitoring a plurality of media programs which are broadcast to and received by the media output device on a plurality of available channels besides the first channel during the operating of the media output device to display the media program;
    analyzing, by the processor, a content of each of the plurality of media programs by comparing the content of each of the plurality of media programs to the set of user preferences and ranking the plurality of programs based on results of the comparing of the content of each of the plurality of media programs to the set of user preferences,
    wherein the ranking of the plurality of programs is based on a priority value calculated through a priority function which considers whether each program is news, sports, a movie, a comedy or a drama, whether each program includes advertisements, certain political views, analysis and discussion or violence, whether each program is a certain length of time and is broadcast at a certain time and whether each program is a continuation of another program;
    automatically selecting one of the plurality of media programs as an optimal media program based on the rankings; and
    automatically switching the media output device from the first channel to one of the plurality of available channels which corresponds to the optimal media program so as to terminate the display of the media program and to display the optimal media program instead
    wherein the computer-implemented method further comprises monitoring activity of a user in manually overriding automatic switching of the media output device from the first channel to the one of the plurality of available channels, analyzing results of the monitoring of the activity for patterns in the manually overriding and modifying the set of user preferences based on pattern analysis of the patterns.

2. The computer-implemented method of claim 1, wherein the user preferences include one or more of programming channel, program category, content of the program, or time of day.

3. The computer-implemented method of claim 1, further comprising repeating the steps of analyzing, comparing, ranking, selecting an optimal program based on the rankings, and switching at a selected time interval.

4. A media system comprising:
    a media output device;
    a user interface; and
    a controller operably connected to the media output device and to the user interface, the controller including a control system which is switchable into an on-state via the user interface and receptive of a fingerprint, alphanumeric code or facial recognition identifier of a user via the user interface,
    the control system being configured to select a set of user preferences in an event the identifier is found and to collect a new identifier or to enter a normal operating mode in an event the identifier is not found,
    the control system being further configured to:
    operate the media output device to display a media program which is broadcast to and received by the media output device on a first channel;
    monitor a plurality of media programs which are broadcast to and received by the media output device on a plurality of available channels besides the first channel during the operation of the media output device to display the media program;

analyze a content of each of the plurality of media programs by a comparison of the content of each of the plurality of media programs to the set of user preferences and a ranking of the plurality of programs based on results of the comparing of the content of each of the plurality of media programs to the set of user preferences, wherein the computer-implemented method further comprises monitoring activity of a user in manually overriding automatic switching of the media output device from the first channel to the one of the plurality of available channels, analyzing results of the monitoring of the activity for patterns in the manually overriding and modifying the set of user preferences based on pattern analysis of the patterns;

automatically select one of the plurality of media programs as an optimal media program based on the rankings;

automatically switch the media output device from the first channel to one of the plurality of available channels which corresponds to the optimal media program so as to terminate the display of the media program and to display the optimal media program instead;

monitor activity of a user in manually overriding an automatic switch of the media output device from the first channel to the one of the plurality of available channels, analyzing results of the monitoring of the activity for patterns in the manually overriding and modifying the set of user preferences based on pattern analysis of the patterns.

5. The media system of claim 4, wherein the user preferences include one or more of programming channel, program category, content of the program, or time of day.

6. The media system of claim 4, wherein the controller is further configured to repeat the steps of analyzing, comparing, ranking, selecting, and switching at a selected time interval.

7. The media system of claim 4, wherein the media output device is a display screen.

8. The media system of claim 7, wherein the controller is one of a television receiver, cable television controller, radio, or computer.

* * * * *